(12) United States Patent
Gulati et al.

(10) Patent No.: US 7,774,481 B2
(45) Date of Patent: Aug. 10, 2010

(54) METHODS AND APPARATUS FOR IMPLEMENTING A PLUGGABLE POLICY MODULE WITHIN A SESSION OVER INTERNET PROTOCOL NETWORK

(75) Inventors: Aman Gulati, Falls Church, VA (US); Bruce Mattie, Germantown, MD (US); Amar Sathyanarayanan, Gaithersburg, MD (US); Paritosh Tyagi, Germantown, MD (US)

(73) Assignee: Genband US LLC, Plano, TX (US)

( * ) Notice: Subject to any disclaimer, the term of this patent is extended or adjusted under 35 U.S.C. 154(b) by 0 days.

(21) Appl. No.: 11/694,398

(22) Filed: Mar. 30, 2007

(65) Prior Publication Data

US 2008/0162720 A1    Jul. 3, 2008

Related U.S. Application Data

(60) Provisional application No. 60/882,713, filed on Dec. 29, 2006.

(51) Int. Cl.
*G06F 15/16* (2006.01)
(52) U.S. Cl. .................................. 709/228; 709/238
(58) Field of Classification Search ................ 709/228, 709/238
See application file for complete search history.

(56) References Cited

U.S. PATENT DOCUMENTS

| | | | |
|---|---|---|---|
| 4,984,264 A | 1/1991 | Katsube | |
| 6,173,322 B1 * | 1/2001 | Hu | 709/224 |
| 6,339,594 B1 | 1/2002 | Civanlar et al. | |
| 6,426,955 B1 | 7/2002 | Gossett Dalton, Jr. et al. | |
| 6,505,244 B1 * | 1/2003 | Natarajan et al. | 709/223 |
| 6,584,110 B1 | 6/2003 | Mizuta et al. | |
| 6,775,269 B1 | 8/2004 | Kaczmarczyk et al. | |
| 6,775,280 B1 | 8/2004 | Ma et al. | |
| 6,798,786 B1 * | 9/2004 | Lo et al. | 370/468 |

(Continued)

FOREIGN PATENT DOCUMENTS

WO    WO 02/49279 A2    6/2002

(Continued)

OTHER PUBLICATIONS

Yenra: VOIP: Session Border Controller [online], dated Oct. 18, 2004, [retrieved on Dec. 20, 2004]. Retrieved from the Internet: <URL: http://www.yenra.copm/session-border-controller/> (2 pages).

(Continued)

*Primary Examiner*—Thu Nguyen
*Assistant Examiner*—Brian Whipple
(74) *Attorney, Agent, or Firm*—Jenkins, Wilson, Taylor & Hunt, P.A.

(57) ABSTRACT

In one embodiment, a method includes associating a pluggable policy module with an application when executing at a session layer device within a session over Internet Protocol (SoIP) network. A policy service request can be received at the session layer device from an endpoint in communication with the session layer device. The method also includes defining a session control protocol signal based on a policy value sent to the application from the pluggable policy module. The policy value can be calculated at the pluggable policy module based on an input value associated with the policy service request.

18 Claims, 5 Drawing Sheets

U.S. PATENT DOCUMENTS

| | | | |
|---|---|---|---|
| 6,904,017 | B1 | 6/2005 | Meempat et al. |
| 6,907,004 | B1 | 6/2005 | Ramsey et al. |
| 6,914,883 | B2 | 7/2005 | Dharanikota |
| 6,928,069 | B2 | 8/2005 | Nakanishi |
| 6,944,150 | B1* | 9/2005 | McConnell et al. ......... 370/352 |
| 6,965,562 | B2 | 11/2005 | Tuomi |
| 6,976,087 | B1 | 12/2005 | Westfall et al. |
| 7,002,973 | B2 | 2/2006 | MeLampy et al. |
| 7,028,092 | B2 | 4/2006 | MeLampy et al. |
| 7,046,683 | B1 | 5/2006 | Zhao |
| 7,072,303 | B2 | 7/2006 | MeLampy et al. |
| 7,133,923 | B2 | 11/2006 | MeLampy et al. |
| 7,151,781 | B2 | 12/2006 | MeLampy et al. |
| 7,236,483 | B2 | 6/2007 | Yeom |
| 7,320,123 | B2* | 1/2008 | Govindarajapuram et al. .... 717/124 |
| 7,626,929 | B2 | 12/2009 | Mallesan |
| 2002/0083185 | A1 | 6/2002 | Ruttenberg et al. |
| 2002/0181401 | A1 | 12/2002 | Hagirahim et al. |
| 2003/0091028 | A1 | 5/2003 | Chang et al. |
| 2004/0002864 | A1 | 1/2004 | Yeom |
| 2004/0054791 | A1* | 3/2004 | Chakraborty et al. ....... 709/229 |
| 2005/0007954 | A1 | 1/2005 | Sreemanthula et al. |
| 2005/0041648 | A1 | 2/2005 | Bharatia et al. |
| 2005/0081059 | A1* | 4/2005 | Bandini et al. .............. 713/201 |
| 2005/0185657 | A1* | 8/2005 | Karanassos ................ 370/401 |
| 2006/0077962 | A1 | 4/2006 | Wu |
| 2006/0077964 | A1 | 4/2006 | Wu et al. |
| 2006/0098577 | A1 | 5/2006 | MeLampy et al. |
| 2006/0143685 | A1* | 6/2006 | Vasishth et al. ................ 726/1 |
| 2006/0250959 | A1 | 11/2006 | Porat |
| 2007/0019544 | A1 | 1/2007 | Ashwood Smith et al. |
| 2007/0027975 | A1* | 2/2007 | Tai et al. .................... 709/223 |
| 2007/0036151 | A1 | 2/2007 | Baeder |
| 2007/0061397 | A1* | 3/2007 | Gregorat et al. ............. 709/203 |
| 2007/0076603 | A1 | 4/2007 | MeLampy et al. |
| 2007/0116043 | A1 | 5/2007 | MeLampy et al. |
| 2007/0211716 | A1* | 9/2007 | Oz et al. .................... 370/389 |
| 2008/0049787 | A1 | 2/2008 | McNaughton et al. |
| 2008/0159136 | A1 | 7/2008 | Mallesan |
| 2010/0036779 | A1* | 2/2010 | Sadeh-Koniecpol et al. ... 706/11 |

FOREIGN PATENT DOCUMENTS

| | | |
|---|---|---|
| WO | WO 02/49315 A2 | 6/2002 |
| WO | WO 02/49316 A2 | 6/2002 |
| WO | WO 02/058349 | 7/2002 |
| WO | WO 2004/071027 A1 | 8/2004 |

OTHER PUBLICATIONS

ACME Packet, Inc., "Session Admission Control: Interactive Communication SLAs over Skinny Pipes" (2002)(14 pages).

International Search Report and Written Opinion mailed Jul. 28, 2008 for International Application No. PCT/US07/68129, 8 pages.

Official Action for U.S. Appl. No. 11/032,562 (Aug. 7, 2009).

Notice of Allowance and Fee(s) Due for U.S. Appl. No. 11/690,348 (Jul. 9, 2009).

Interview Summary for U.S. Appl. No. 11/032,562 (Jun. 1, 2009).

Final Official Action for U.S. Appl. No. 11/032,562 (Jan. 16, 2009).

Non-Final Official Action for U.S. Appl. No. 11/690,348 (Nov. 13, 2008).

Notification of Transmittal of the International Search Report and the Written Opinion of the International Searching Authority, or the Declaration for International Application No. PCT/US07/66627 (May 21, 2008).

Non-Final Official Action for U.S. Appl. No. 11/032,562 (May 9, 2008).

Communication pursuant to Rules 109 and 110 EPC for European Application No. 05807585.4 (Jul. 19, 2007).

Notification of European Publication No. and Information on the Application of Article 67(3) EPC for European Application No. 05807585.4 (Jun. 13, 2007).

Notification of Transmittal of the International Search Report and the Written Opinion of the International Searching Authority, or the Declaration for International Application No. PCT/US05/36381 (May 15, 2007).

* cited by examiner

METHODS AND APPARATUS FOR IMPLEMENTING A PLUGGABLE POLICY MODULE WITHIN A SESSION OVER INTERNET PROTOCOL NETWORK

RELATED APPLICATION

The present application claims priority to the commonly owned U.S. Provisional Patent Application No. 60/882,713, entitled "Methods and Apparatus for Implementing a Pluggable Policy Module of a Session Border Controller within a Session over Internet Protocol Network," filed on Dec. 29, 2006, which is incorporated herein by reference in its entirety.

BACKGROUND

Embodiments of the invention relate generally to session border controller policies, and, in particular, to methods and apparatus for implementing a pluggable policy module of a session border controller within a session over Internet Protocol network.

Call routing, call admission control and/or media routing of a session border controller within a session over Internet Protocol (SoIP) network can be customized based on preferences of a particular user or system manager of the session border controller. The preferences can be implemented using, for example, a static script that can be uploaded to one or more session border controllers within the SoIP network. These scripts can include the preferences of one or more users with respect to, for example, call admission control. Because scripts are often integrated into the primary application of a session border controller, a modified script (e.g., a script with a modified feature) and/or a new script are not typically implemented on a session border controller during run-time. Typically, the session border controller temporarily powers down to implement the script on the session border controller. Thus, a need exists for a method and apparatus for implementing a run-time pluggable policy module for a session border controller.

SUMMARY OF THE INVENTION

In one embodiment, a method includes associating a pluggable policy module with an application when executing at a session layer device within a session over Internet Protocol (SoIP) network. A policy service request can be received at the session layer device from an endpoint in communication with the session layer device. The method also includes defining a session control protocol signal based on a policy value sent to the application from the pluggable policy module. The policy value can be calculated at the pluggable policy module based on an input value associated with the policy service request.

DETAILED DESCRIPTION

Figure 1:
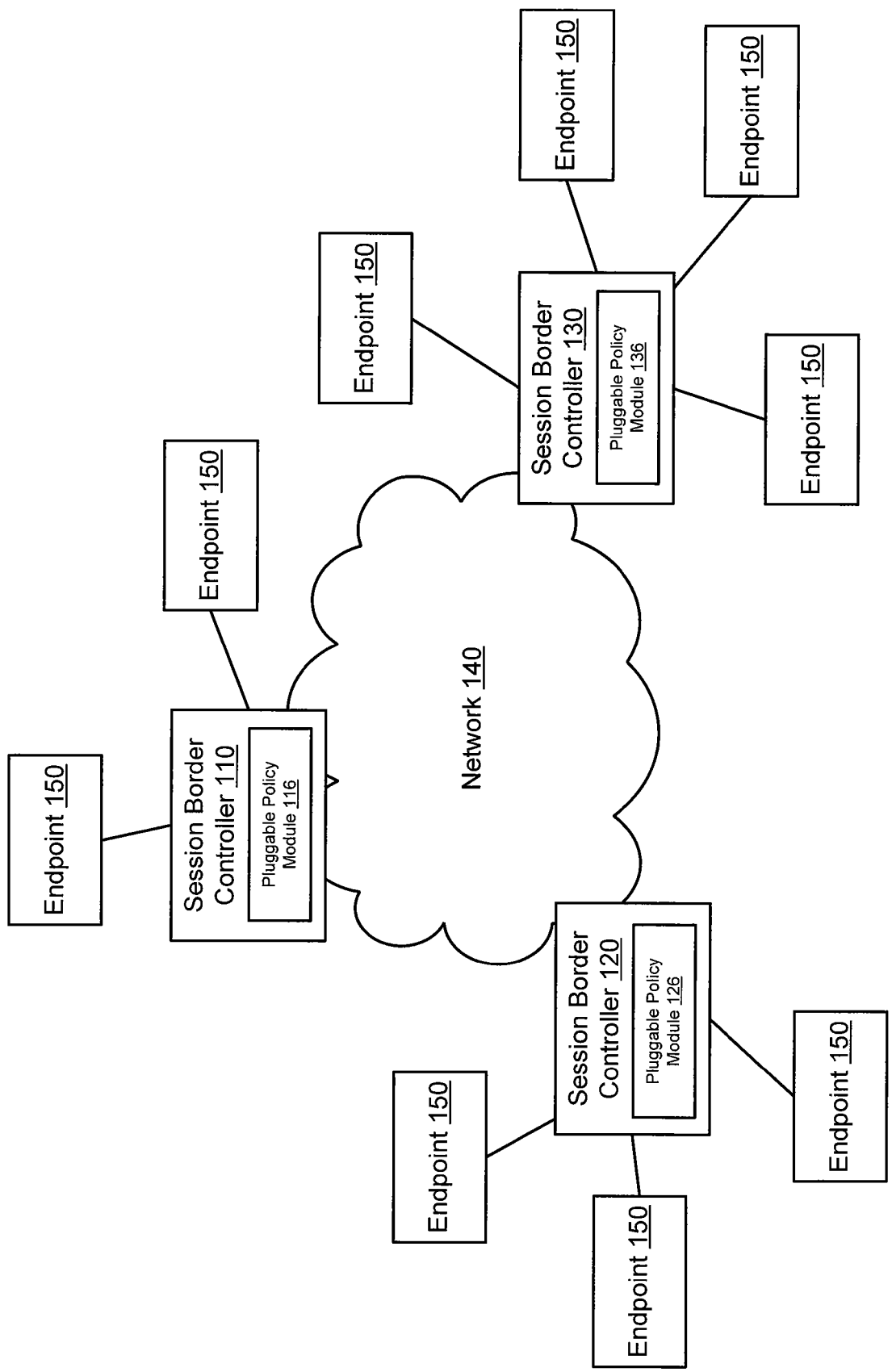
FIG. 1 is a schematic diagram that illustrates session border controllers configured to establish, control, and/or monitor sessions and/or media signaling between endpoints based on pluggable policy modules, according to an embodiment of the invention.

FIG. 1 is a schematic diagram that illustrates session border controllers 110, 120, and 130 configured to establish, control, and/or monitor sessions (e.g., session control signaling) and/or media signaling between endpoints 150 based on pluggable policy modules 116, 126, and 136, respectively, according to an embodiment of the invention. The session border controllers (SBCs) 110, 120, and 130, which can be referred to as a session layer device, are in communication with one another, for example, through the network 140. The network 140 can be a wireless or wired network configured to transmit data and/or media content such as voice content and/or video content. For example, portions of the network 140 can be used to establish session over Internet Protocol (SoIP) sessions such as voice over Internet Protocol (VoIP) sessions or media over Internet Protocol (MoIP) sessions. The session border controllers 110, 120, and 130 can be, for example, multi-protocol session exchange devices configured to use more than one session control protocol (e.g., session initiation protocol (SIP)).

Each of the session border controllers 110, 120, and 130 is in communication with at least one endpoint 150. In some embodiments, more than one of the session border controllers 110, 120, and/or 130 can be in communication with a single endpoint 150. In some alternative embodiments, the session border controllers can be connected with a network controller that is a centralized management component that is configured to control, configure, and/or coordinate the network of session border controllers.

The pluggable policy modules 116, 126, and/or 136 are modules that can be used to implement a policy (e.g., preference, condition) that is associated with at least one of several principal functions of the session border controllers 110, 120, and/or 130. Functions of the session border controllers 110, 120, and/or 130 include establishing, controlling, and/or monitoring session control signaling (e.g., sessions) and/or media signaling such as, for example, authentication, authorization, call admission control, device registration, call routing, media routing, and so forth. In some embodiments, the pluggable policy modules 116, 126, and/or 136 can be configured to implement a policy based on content-type (e.g., voice, video) associated with a media signal. The values returned by the pluggable policy module 126 can be referred to as returned-policy values or policy values.

For example, the pluggable policy module 126 can be a pluggable routing policy module that can be used to implement a call routing policy on session border controller 120. When routing a call between one endpoint 150 and another endpoint 150 using, for example, session control signals, the session border controller 120 can base the call routing (e.g., defining of session control signals) on policy values obtained by executing the pluggable policy module 126. Each of the pluggable policy modules 116, 126, and/or 136 can be used to calculate one or more policy values based on input values that can be open systems interconnection (OSI) layer-5 parameter values (e.g., session layer parameters, session identifiers, truck group identifiers, content-type identifiers) and/or OSI layer-3 parameter values.

In some embodiments, the pluggable policy modules 116, 126, and/or 136 are individually compiled (or interpretable) modules that can be plugged into their respective session border controllers 110, 120, and/or 130 during run-time. In other words, the pluggable policy modules 116, 126, and/or 136 can be complied before they are associated with their respective session border controllers 110, 120, and/or 130. The pluggable policy modules 116, 126, and/or 136 can be implemented using, for example, an object oriented programming language such as C++ or an interpreted programming language such as Java or Lua. As stand-alone, compiled executable (e.g., interpretable) modules, the pluggable policy modules 116, 126, and/or 136 can be dynamically linked or unlinked to the session border controllers 110, 120, and/or 130, respectively. In other words, the pluggable policy modules 116, 126, and/or 136 can be loaded onto their respective session border controllers 110, 120, and/or 130 without temporarily powering down the session border controllers 110, 120, and/or 130. The pluggable policy modules 116, 126, and/or 136 can be configured to implement, for example, a user-defined policy using any combination of threshold conditions, objects, libraries, and/or algorithms. For example, a round-robin algorithm or weighted fair queuing algorithm can be implemented by a pluggable policy module, such as pluggable policy module 116, for routing calls to one or more endpoints 150. In some embodiments, the pluggable policy modules 116, 126, and/or 136 can be configured as shared object modules (e.g., *.so) or dynamically linked library modules (e.g., *.dll).

The pluggable policy modules 116, 126, and 136 can be configured to return a policy value in response to an internal request defined by the session border controllers 110, 120, and/or 130, respectively. A request for a policy value can be referred to as a policy service request. For example, pluggable policy module 136 can be configured to calculate one or more policy values based on one or more input values (can also be referred to as parameter values) received within a policy service request from, for example, an endpoint 150 in communication with session border controller 120. If several pluggable policy modules (e.g., library of pluggable policy modules) are loaded onto a session border controller, the session border controller, such as session border controller 130, can determine (e.g., select) which of the several pluggable policy modules to execute to satisfy the policy service request. In some embodiments, the policy service request can include an indicator of the type of policy value requested (e.g., call admission control (CAC)-related policy value) and the appropriate pluggable policy module can be executed by the session border controller 110, 120, and/or 130 based on the indicator. The indicator can be included in the policy service request as an input value of the policy service request.

Each endpoint 150 can be, for example, a public switched telephone network (PSTN), a broadband network that can provide network access to broadband consumers, an enterprise network, an H.323 network, a SIP softswitch network, or a SIP network. An endpoint 150 can alternatively be an individual phone/computer terminal or an access point (e.g., another SBC) to another SoIP network. Of course, the various endpoints 150 can include any combination of the above examples. Each of the endpoints 150 is an endpoint from the perspective of the individual session border controller 110, 120, and/or 130 that is in communication with that endpoint 150. The session border controllers 110, 120, and/or 130 can be configured to translate a protocol from one endpoint 150 into a protocol associated with a different endpoint 150.

Figure 2:
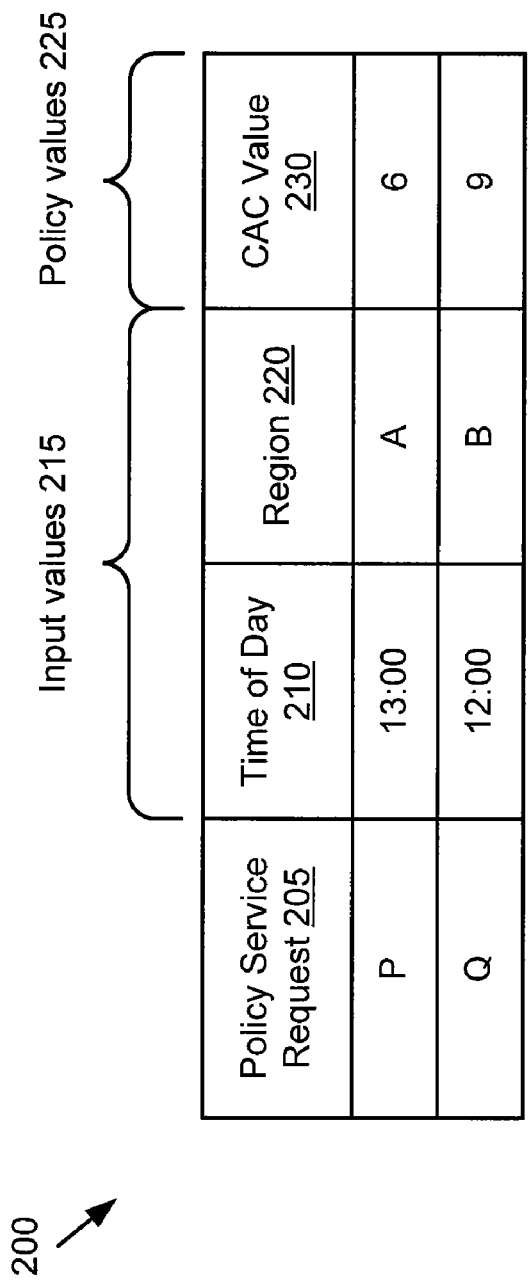
FIG. 2 is a table that illustrates an example of policy values calculated using a pluggable policy module in response to a policy service request that includes several input values, according to an embodiment of the invention.

FIG. 2 is a table 200 that illustrates an example of policy values 225 calculated using a pluggable policy module in response to a policy service request 205 that includes several input values 215, according to an embodiment of the invention. The table 200 includes a CAC value of 6 that is calculated as a policy value 225 based on policy service request P. Policy service request P includes a time of day value of 13:00 and a region value of A. The CAC value 230 can be calculated based on an algorithm of the pluggable policy module that uses the input values 215 as arguments when the pluggable policy module is executed by the session border controller.

In some embodiments, a session request (e.g., session control protocol signal), can be defined based on the policy value 225 calculated using the pluggable policy module. For example, the policy service request P can be associated with a particular endpoint. The CAC value of 6 calculated based on the policy service request P can, for example, trigger a session border controller to define a session control protocol signal associated with the endpoint, for example, if the CAC value of 6 satisfies a threshold condition, The session control protocol signal can be, for example, a request to establish a session between the endpoint and another device. In some embodiments, the threshold condition can be associated with the pluggable policy module (e.g., used by the pluggable policy module, incorporated in an algorithm of the pluggable policy module).

Figure 3:
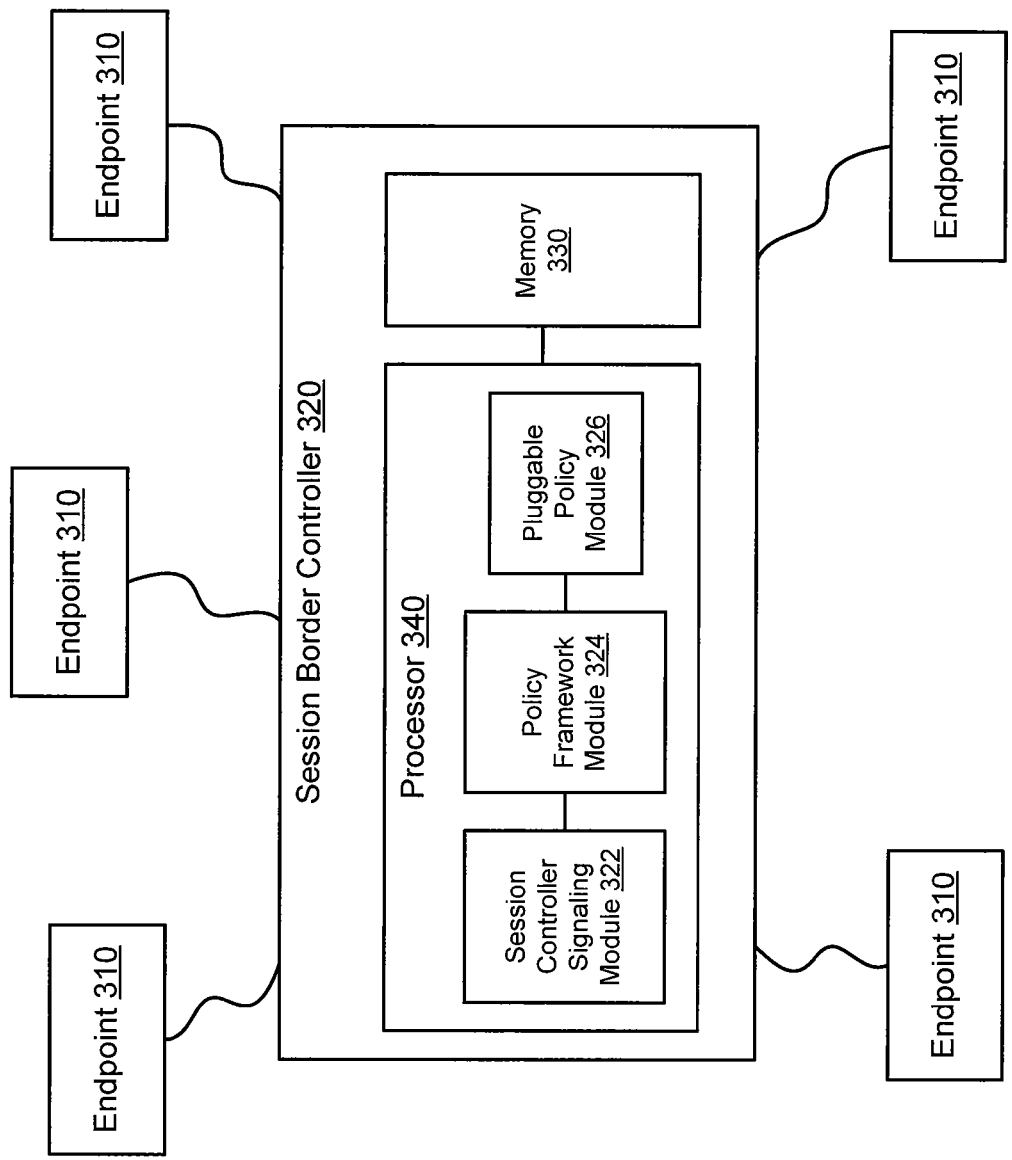
FIG. 3 is a schematic diagram that illustrates a session border controller that operates based on a pluggable policy module, according to an embodiment of the invention.

FIG. 3 is a schematic diagram that illustrates a session border controller 320 that operates based on a pluggable policy module 326, according to an embodiment of the invention. In this embodiment, the session border controller 320 includes a session controller signaling module 322, a policy framework module 324, and a pluggable policy module 326. Although the modules 322, 324, and 326 are illustrated as software modules that can be executed using processor 340, in some embodiments, the modules, 322, 324, and/or 326 can be implemented using any combination of hardware and/or software. The session border controller 320 also includes a memory 330 that can be used (e.g., accessed) by processor 340 when executing the modules 322, 324, and/or 326. The memory 330 can be a random access memory (RAM), virtual memory, cache, hard drive, or removable storage (e.g., compact flash card). The session border controller 320 can also include one or more input ports and/or output ports to send and receive, for example, the pluggable policy module 326, a policy service request, and/or an input value.

The session border controller 320 can be configured to establish, control, trigger, and/or monitor, at least in part, sessions and/or media signaling between one or more endpoints 310 using the modules 322, 324, and 326. The session controller signaling module 322 is a module that performs functions of the session border controller 320 such as establishing, controlling, and/or monitoring sessions and/or media signaling between the endpoints 310. The session controller signaling module 322 is used, for example, to process signals and/or requests received from the endpoints 310. The session border controller 320 can establish, control, trigger, and/or monitor the sessions and/or media signaling through, for example, session control protocol signaling (e.g., layer-5 signaling). In some embodiments, for example, the session border controller 320 can define a session control protocol signal that can be sent to another session border controller (not shown) associated with, for example, one or more endpoints (e.g., destination endpoints, source endpoints)

The pluggable policy module 326 is a module that can be executed during run-time of the session border controller 320 to return one or more values based on input values (e.g., OSI layer-5 parameter values). The pluggable policy module 326 can be used to implement a policy (e.g., preference) associated with at least one of the functions of the session border controller 320. The policy framework module 324 is a module that can be configured to function as an interface between the session controller signaling module 322 and the pluggable policy module 326.

The policy framework module 324, in this embodiment, can execute the pluggable policy module 326 to obtain policy values for the session controller signaling module 322 based on one or more input values. The input values can be received by the policy framework module 324 and used by the pluggable policy module 326 when the pluggable policy module 326 is executed by the policy framework module 324. In some embodiments, the input values are OSI layer-5 parameter values received from, for example, the session controller signaling module 322. In other embodiments, the input values are OSI layer-3 parameter values received from, for example, the session controller signaling module 322. In yet other embodiments, the input values can be OSI layer-5 parameter values and/or OSI layer-3 parameter values received from, for example, the session controller signaling module 322. The session controller signaling module 322 can receive the input values from, for example, an endpoint 310 and/or can produce the input values. In some embodiments, the session border controller 320 can be configured to implement or trigger layer-3 routing in response to policy values calculated using the pluggable policy module 326.

The pluggable policy module 326 can be configured to handle (e.g., produce or define a policy value based on) an input value that is a variable length input value or a fixed length input value. The pluggable policy module 326 can be configured to handle a null input value or an empty input value that can be related to, for example, a session layer parameter value field (e.g., associated with OSI layer-5). In some embodiments, the input values can be associated with a signal control protocol. For example, the input value can be associated with a method and/or a header associated with a session control protocol. In some embodiments, the input values can be associated with an extendable session control protocol such as SIP. For example, the input value can be associated with a method (e.g., call) and/or a header associated with an extendable portion of a session control protocol. In some embodiments, the input values can be associated with a content-type associated with a media signal.

The session controller signaling module 322 can send one or more input values to the policy framework module 324 as arguments in a policy service request. For example, a policy service request from the session controller signaling module 322 can have the form of an application program interface (API) call such as "Int PolicyServiceRequest(int PolicyModuleID, InputValue1, InputValue2, . . . )."

The policy framework module 324 can execute the pluggable policy module 326 to obtain policy values for the session controller signaling module 322 so that the session controller signaling module 322 can perform a function. For example, when the session border controller 320 performs a function such as a call admission control (CAC) calculation associated with an endpoint 310, the pluggable policy module 326 can be executed by the policy framework module 324 and policy values returned to the session controller signaling module 322 to complete the call admission control (CAC) calculation. In some embodiments, the pluggable policy module 326 can be executed using a policy engine (not shown) of the policy framework module 324. In some embodiments, the functionality of the policy framework module 324 can be integrated into the session controller signaling module 322 and a separate module is not necessary.

The policy framework module 324 can be configured to determine the input values (e.g., the number and/or types of arguments) that may be used by the pluggable policy module 326 to calculate one or more policy values. The policy framework module 324 can make this determination when the pluggable policy module 326 is executed and/or when the pluggable policy is initially loaded as a module within the session border controller 320. The input value usage of a pluggable policy module 326 can be provided by the pluggable policy module 326 and imported by the policy framework module 324 when the pluggable policy module 326 is linked to the policy framework module 324. The policy framework module 324 can produce, receive and/or retrieve input values, if appropriate, from the session controller signaling module 322.

The policy framework module 324, as an interface between the pluggable policy module 326 and the session controller signaling module 322, can provide input values, if used by the pluggable policy module 326 to calculate a policy value, to the pluggable policy module 326. For example, the policy framework module 324 can deny a policy service request from the session controller signaling module 322 when the policy service request does not include the input values for the pluggable policy module 326 to calculate a policy value. In some embodiments, the policy framework module 324 can analyze a policy service request and can request that the session controller signaling module 322 modify the policy service request (e.g., send an additional input value within the policy service request) if the policy service request is defective (e.g., missing an input value).

In some embodiments, the session border controller 320 can include more than one type of pluggable policy module (not shown) in addition to pluggable policy module 326. The policy service request can be configured to call a particular type of pluggable policy module for execution based on a hook point associated with each type of pluggable policy module loaded onto session border controller 320. For example, if session border controller 320 includes a pluggable routing policy module and a pluggable CAC policy module, the policy framework module 324 can execute the pluggable routing policy module in response to a policy service request that includes an indicator of the hook point associated with the pluggable routing policy module. The hook point can be, for example, a pluggable policy module identifier.

In some embodiments, the session border controller 320 can include multiple versions (not shown) of pluggable policy module 326. Although not shown in FIG. 3, a new policy or an updated version of a policy can be compiled into an updated (e.g., new) version of the pluggable policy module 326. The updated version of the pluggable policy module can be dynamically linked to the framework module 324 and subsequently used by the session controller signaling module 322. In some embodiments, the updated pluggable policy module can be loaded from a removable storage device (not shown) or storage media (not shown) and loaded onto the session border controller 320.

Because the pluggable policy module 326 can be a standalone, compiled executable module, the pluggable policy module 326 can be dynamically linked or unlinked to the policy framework module 324 similar to dynamic linking or unlinking of a library to an application. In other words, the policy framework module 324 and the session controller signaling module 322 can continue functioning (e.g., in a fully operational state, application(s) continue executing) while the pluggable policy module 326 is loaded or unloaded. New pluggable policy modules (not shown) or different versions (not shown) of the pluggable policy module 326 can be dynamically linked or unlinked to the policy framework module 324.

In some embodiments, an out-dated version of the pluggable policy module 326 can be unloaded from the session border controller 320 when a new version of the pluggable policy module 326 is loaded. The policy framework module 324 can be configured to manage the loading and/or unloading of versions of the pluggable policy module 326. In some embodiments, the policy framework module 324 can be configured to manage multiple versions of a pluggable policy module 326. A policy framework module configured to manage multiple versions of a pluggable policy module for multiple session border controllers is described in connection with FIG. 4.

To avoid conflicts and/or errors when an updated version of a pluggable policy module is loaded onto the session border controller 320, the old and/or updated versions of the pluggable policy module can be temporarily locked or a policy service request associated with the pluggable policy module held for a period of time. For example, if a policy service request is defined and sent by the session controller signaling module 322 to the policy framework module 324 while an updated version of a pluggable policy module is being loaded, the policy service request can be held, for example, for a specified a period of time. The policy service request can, in some embodiments, be held at, for example, the policy framework 324 until the policy framework 324 verifies that the updated version has been properly loaded. After the updated version has been properly loaded, the policy service request can be released and used to, for example, trigger calculation of a policy value based on the updated version of the policy. In some embodiments, the policy framework 324 can send an indicator to the session controller signaling module 322 that triggers the session controller signaling module 322 to hold one or more policy service requests until the updated version of the pluggable policy module has been loaded.

In some embodiments, if a policy value returned by an updated version of a pluggable policy module is invalid because the updated version of the pluggable policy module is defective and/or malfunctioning, the policy framework module 324 can be configured to use the old version of the pluggable policy module (e.g., roll back to the old version). The session controller signaling module 322 can send a signal to the policy framework module 324 indicating that the policy value is invalid based on user-defined criteria used to validate the policy value.

In some embodiments, the pluggable policy module 326 can be configured to implement multiple policies that each correspond with a function of the session border controller 320. In some embodiments, the pluggable policy module 326 is a collection of policy modules that are interdependent. In some embodiments, the pluggable policy module 326 can be implemented as an interpretive script (e.g., lua script, perl script) or as a configurable script file that can be implemented during run-time using the policy framework module 324.

In some embodiments, the pluggable policy module 326 can be configured to calculate a policy value based on a policy configuration parameter value stored in the memory 330. For example, a pluggable policy module 326 can be configured with several routing policy algorithms that can be used to calculate a routing policy value. The policy configuration parameter value can be used, for example, to trigger one of the several routing policy algorithms within the pluggable policy module 326 to be executed in response to a policy service request for a particular endpoint 310.

In some embodiments, the policy framework module 324 can be configured to retrieve one or more policy configuration parameter values from the memory 330 based on a policy service request from the session controller signaling module 322. The pluggable policy module 326 can use the retrieved policy configuration parameter value when the pluggable policy module 326 is executed by the policy framework module 324. In some embodiments, the pluggable policy module 326 can be configured to calculate a policy value based not only on an input value from the session controller signaling module 322, but also based on a policy configuration parameter stored in the memory 330.

In some embodiments, one or more policy configuration parameter values can be stored in a database (not shown) that can be accessed by the policy framework module 324. The database can be a database accessible by multiple users such that each of the users can define policy configuration parameter values that can be used by the pluggable policy module 326. In some embodiments, the session controller signaling module 322, the policy framework module 324, and/or the pluggable policy module 326 can be configured to operate using one or more database schema defined by a user and/or a network administrator (e.g., defined within an API). For example, a policy value can be calculated (or modified), for example, using pluggable policy module 326, such that the policy value is compatible with a schema associated with a database. Likewise, input values can be defined (or modified), for example, using pluggable policy module 326, such that they are compatible with a schema associated with a database. In some embodiments, the schema associated with a database can be based on an extendable protocol associated with, for example, a session control protocol.

Figure 4:
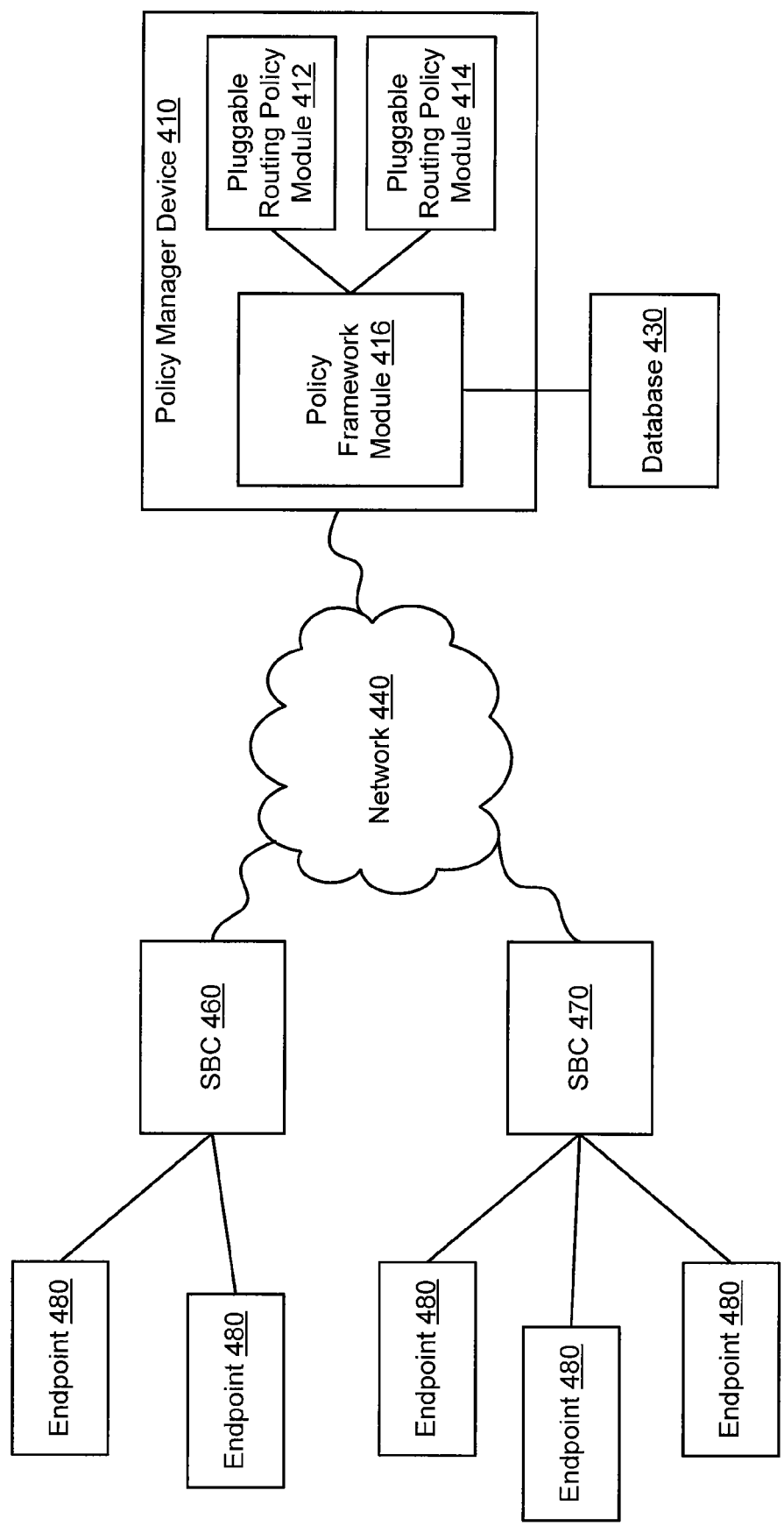
FIG. 4 is a schematic diagram that illustrates a policy manager device configured to manage multiple pluggable routing policy modules for multiple session border controllers, according to an embodiment of the invention.

FIG. 4 is a schematic diagram that illustrates a policy manager device 410 configured to manage multiple pluggable routing policy modules for multiple session border controllers, according to an embodiment of the invention. Specifically, the policy manager device 410 is configured to implement pluggable routing policy modules 412 and 414 for session border controllers 460 and 470. The policy manager device and the session border controllers 460 and 470 can be referred to as session layer devices. Each of the session border controllers 460 and 470 is connected with multiple endpoints 480. The policy manager device 410 is in communication with the session border controllers 460 and 470 through network 440. Network 440 can be, for example, a session over Internet Protocol (SOIP) such as a media over Internet Protocol (MOIP) and/or a voice over internet protocol (VoIP) network. The policy manager device 410 can include one or more processors (not shown), input ports (not shown), and/or output ports (not shown) to receive and/or process pluggable policy modules (e.g., routing pluggable policy modules 412 and 414) and/or policy service requests.

The policy manager device 410 includes a policy framework module 416 configured to execute the pluggable routing policy modules 412 and/or 414 for session border controllers 460 and/or 470. For example, the policy manager device 410 can be configured to receive an input value (e.g., session layer parameters in a policy service request) from session border controller 460 at the policy framework module 416. The policy framework module 416 can use the input value when executing pluggable policy module 414 to calculate one or more policy values. After a policy value has been calculated, the policy manager device 410 can be configured to send the policy value to the requesting session border controller 460. In this embodiment, the pluggable routing policy modules 412 and 414 are different routing policies. For example, routing policy module 412 can be an older version of the routing policy module 414 or a version with different capabilities.

The policy manager device 410 can be configured to detect (e.g., based on a condition) whether the session border controllers 460 and/or 470 are compatible with either one of the pluggable routing policy modules 412 and/or 414. For example, if session border controller 460 is compatible with pluggable routing policy module 412 and not compatible with pluggable routing policy module 414, the policy manager device 410 can be configured to select and execute pluggable routing policy module 412 rather than pluggable routing policy module 414 in response to a policy service request (e.g., based on an input value from the policy service request) from session border controller 460.

The policy manager device 410 can select and execute pluggable routing policy module 412 even if pluggable routing policy module 412 implements an older version of a routing policy than pluggable routing policy module 414. In another example, the policy manager device 410 can determine that the session border controller 460 is only compatible with pluggable routing policy module 412 based on, for example, data in database 430 that indicates the software and/or hardware capabilities of each of the session border controllers 460 and/or 470. The database 430 can include, for example, a look-up table that specifies that session border controller 460 is only capable of routing calls using a routing policy implemented by pluggable routing policy module 412.

In some embodiments, the policy manager device 410 can query the session border controllers 460 and/or 470 to determine whether or not the session border controllers 460 and/or 470 are capable of using policy values calculated using one or more of the pluggable routing policy modules 412 and/or 414. For example, session border controller can 460 send a compatibility response indicating that session border controller 460 can only process policy values using a particular version of a routing policy in response to a request (e.g., ping) from the policy manager device 410. Based on the compatibility response, the policy manager device 410 can be configured to execute routing policy module 412 and/or 414 to produce policy values that are compatible with session border controller 460.

Although FIG. 4 illustrates that the policy manager device 410 is configured to implement one of two pluggable routing policy modules 412 and 414 for the session border controllers 460 and 470, in some embodiments, the policy manager device 410 can be configured to manage multiple pluggable policy modules (e.g., library of pluggable policy modules) that can be different types and/or versions for multiple session border controllers that can be different types and/or operate using different versions of software and/or hardware.

Figure 5:
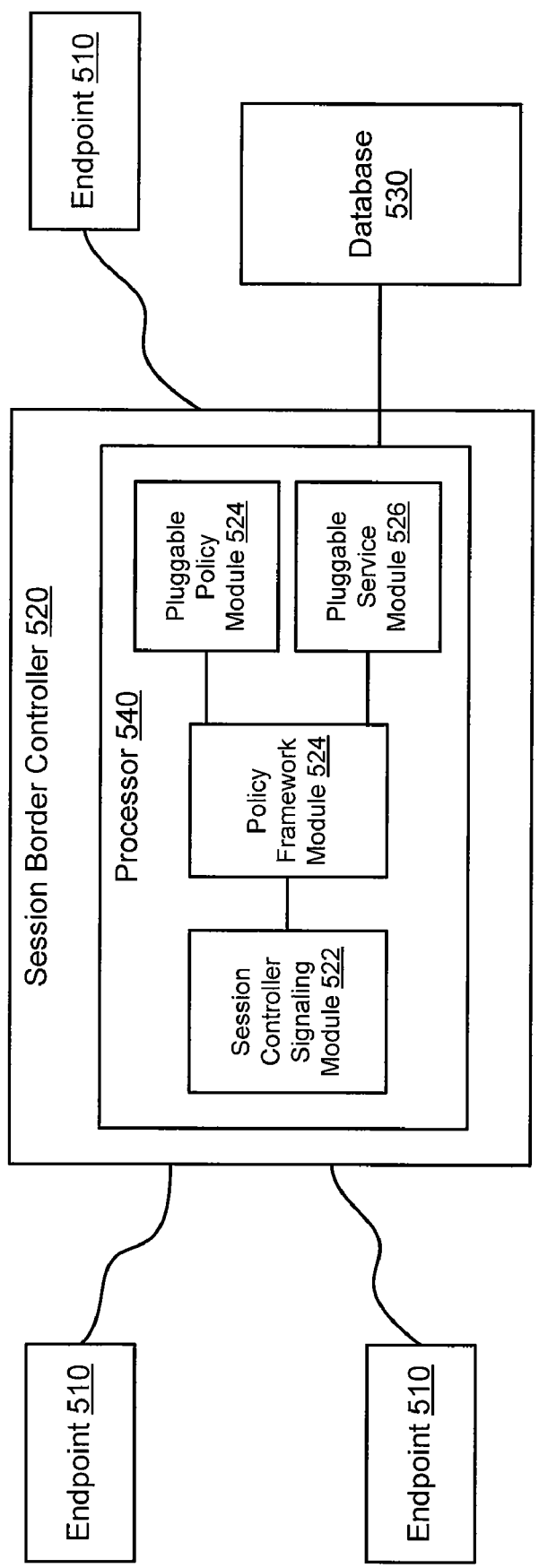
FIG. 5 is a schematic diagram that illustrates a session border controller that is configured to operate using a pluggable policy module and a pluggable service module, according to an embodiment of the invention.

FIG. 5 is a schematic diagram that illustrates a session border controller 520 that is configured to operate using a pluggable policy module 524 and a pluggable service module 526, according to an embodiment of the invention. The pluggable service module 526 is a module configured to implement a service associated with the session border controller 520 based on preferences associated with a user (such as a system administrator). For example, the pluggable service module 526 can be configured to cause the session border controller 520 to log data in database 530 using a particular method or data schema according to a preference of a user. In some embodiments, the pluggable service module 526 can be configured to customize a user interface for a particular user or implement a user-defined remote authentication for session border controller 520.

The pluggable service module 526, like the pluggable policy module 524, is an individually compiled module that can be plugged into session border controller 520 during run-time of the session border controller 520. As a stand-alone, compiled executable module, the pluggable service modules 526 can be dynamically linked or unlinked to the session border controller 520. In other words, the pluggable policy modules 526 can be loaded onto the session border controller 520 without powering down the session border controller 520. The pluggable service module 526 can be configured to implement, for example, a service using any combination of threshold conditions, objects, libraries, and/or algorithms. Also, the pluggable service module 526 can be executed using a policy module framework 524.

Some embodiments of the invention relate to a computer storage product with a computer-readable medium (also can be referred to as a processor-readable medium) having instructions or computer code thereon for performing various computer-implemented operations. The media and computer code (also can be referred to as code) may be those specially designed and constructed for the specific purpose or purposes. Examples of computer-readable media include, but are not limited to: magnetic storage media such as hard disks, floppy disks, and magnetic tape; optical storage media such as Compact Disc/Digital Video Discs ("CD/DVDs"), Compact Disc-Read Only Memories ("CD-ROMs"), and holographic devices; magneto-optical storage media such as optical disks; and hardware devices that are specially configured to store and execute program code, such as Application-Specific Integrated Circuits ("ASICs"), Programmable Logic Devices ("PLDs"), and ROM and RAM devices. Examples of computer code include, but are not limited to, micro-code or micro-instructions, machine instructions, such as produced by a compiler, and files containing higher-level instructions that are executed by a computer using an interpreter. For example, an embodiment of the invention may be implemented using Java, C++, or other object-oriented programming language and development tools. Additional examples of computer code include, but are not limited to, control signals, encrypted code, and compressed code.

In conclusion, among other things, a methods and apparatus for implementing a pluggable policy module and/or a pluggable service module of a session border controller are described. While various embodiments of the invention have been described above, it should be understood that they have been presented by way of example only, and various changes in form and details may be made. For example, the pluggable policy module can be linked to more than one policy framework module within a single session border controller.

What is claimed is:
1. A method, comprising:
associating a pluggable policy module with an application while the application is executing at a session layer device operating within a session over Internet Protocol (SoIP) network, wherein associating the pluggable policy module with the application while the application is executing includes selecting the pluggable policy module from a plurality of pluggable policy modules associated with the application based on an input value, wherein the session layer device comprises a session border controller for routing and controlling calls between endpoints and wherein the pluggable policy module implements a policy to control a call involving at least one of the endpoints;
receiving a policy service request at the session border controller from an endpoint in communication with the session border controller, wherein the policy service request comprises signaling separate from associated media;

defining a session control protocol signal based on a policy value sent to the application from the pluggable policy module, the policy value being calculated by the pluggable policy module based on an input value associated with the policy service request, wherein the policy value comprises a call admission control (CAC) value that triggers, in response to the CAC value satisfying a threshold condition, the session border controller to define the session control protocol signal as a request to establish a session between the endpoint and another device.

2. The method of claim 1, wherein the pluggable policy module is compiled as an executable module before the associating.

3. The method of claim 1, wherein the pluggable policy module is an interpretable module.

4. The method of claim 1, wherein the endpoint is a source endpoint, the session layer device is a first session layer device, the method further comprising:
sending the session control protocol signal to a second session layer device associated with a destination endpoint.

5. The method of claim 1, wherein the policy service request is based on at least one of a media signal or an extendable session layer protocol.

6. The method of claim 1, further comprising:
receiving at the application a policy configuration parameter value associated with the endpoint;
modifying the pluggable policy module based on the policy configuration parameter value; and
calculating the policy value at the pluggable policy module after the modifying.

7. The method of claim 1, wherein the session control protocol signal is associated with a session request.

8. A method, comprising:
associating a first pluggable policy module and a second pluggable policy module with an application when the application is executing at a session layer device associated with a session over Internet Protocol (SoIP) network, wherein associating the first pluggable policy module and the second pluggable policy module with the application when the application is executing includes selecting the pluggable policy modules from a plurality of pluggable policy modules associated with the application based on an input value, wherein the session layer device comprises a session border controller routing and controlling calls between endpoints and wherein one of the first and second pluggable policy modules implements a policy to control a call involving at least one of the endpoints;
sending an input value associated with a policy service request to the first pluggable policy module based on a condition associated with the second pluggable policy module being unsatisfied, the policy service request being associated with an endpoint in communication with the SoIP network, wherein the policy service request comprises signaling separate from associated media; and
calculating based on the first pluggable policy module a policy value based on the input value, wherein the policy value comprises a call admission control (CAC) value that triggers, in response to the CAC value satisfying a threshold condition, the session border controller to define a session control protocol signal as a request to establish a session between an endpoint and another device.

9. The method of claim 8, wherein the first pluggable policy module is compiled as an executable module before the associating.

10. The method of claim 8, further comprising:
receiving from the first pluggable policy module the policy value; and
sending the input value to the second pluggable policy module when the policy value is an invalid policy value.

11. The method of claim 8, wherein the first pluggable policy module is a shared object module.

12. The method of claim 8, wherein the first pluggable policy module is a dynamic link library module.

13. The method of claim 8, wherein the policy service request is associated with at least one of a call admission control calculation, an authentication calculation, a device registration function, a session control protocol, or a media routing determination.

14. A non-transitory processor-readable medium comprising code representing instructions to cause a processor to:
receive an input value associated with a policy service request comprising signaling separate from associated media and associated with an extendable protocol, the policy service request being associated with an endpoint associated with a session over Internet Protocol (SoIP) network and in communication with a session layer device, wherein the session layer device comprises a session border controller routing and controlling calls between endpoints; and
select a pluggable policy module from a plurality of pluggable policy modules associated with the application based on the input value, wherein the pluggable policy module implements a policy to control a call involving at least one of the endpoints;
calculate a policy value based on the input value, wherein the policy value comprises a call admission control (CAC) value that triggers, in response to the CAC value satisfying a threshold condition, the session border controller to define the session control protocol signal as a request to establish a session between an endpoint and another device; and
send the policy value to an application executing at the session border controller.

15. The processor-readable medium of claim 14, wherein the policy value is associated with at least one of a call admission control calculation, an authentication calculation, a device registration function, a session control protocol, or a media routing determination.

16. The processor-readable medium of claim 14, further comprising code representing instructions to cause a processor to:
receive a policy configuration parameter value associated with the endpoint based on the policy service request, the calculating being based on the policy configuration parameter value.

17. The processor-readable medium of claim 14, wherein the calculating is based on a schema associated with a database.

18. The processor-readable medium of claim 14, wherein the input value is a variable length input value or a null input value.

* * * * *